United States Patent [19]

Ivancevich

[11] 4,109,399
[45] Aug. 29, 1978

[54] PAINT - BY - RAINBOW - RING ART KIT WITH PRESTROKED PANEL

[76] Inventor: Marko Ivancevich, 423 N. Broadway, Redondo Beach, Calif. 90277

[21] Appl. No.: 579,957

[22] Filed: May 22, 1975

[51] Int. Cl.² ............................................. G09B 11/10
[52] U.S. Cl. ............................................. 35/26; 35/28.5
[58] Field of Search .................... 35/26, 28.5, 28.3, 41

[56] References Cited

U.S. PATENT DOCUMENTS

| Re. 26,948 | 9/1970 | Klein | 35/26 X |
|---|---|---|---|
| 331,268 | 11/1885 | Woodin | 35/26 |
| 1,805,520 | 5/1931 | Grumbacher | 35/28.5 X |
| 1,957,816 | 5/1934 | Braeg | 35/28.3 X |
| 2,543,998 | 3/1951 | Shulman | 35/26 |
| 2,878,590 | 3/1959 | Dodge | 35/28.5 |
| 3,057,097 | 10/1962 | Douglas | 35/26 X |
| 3,487,133 | 12/1969 | Lindsay | 35/41 X |
| 3,815,265 | 6/1974 | Depauw | 35/28.5 |
| 3,849,911 | 4/1973 | Longenecker | 35/26 |

Primary Examiner—Harland S. Skogquist
Attorney, Agent, or Firm—Jack C. Munro

[57] ABSTRACT

An art kit consisting of a relieved prestroked panel on which figures of the subject matter, are outlined by prominent (three-dimensional) strokes. The kit includes two color guide prints, whose every object and color have a corresponding stroke on the panel. This kit is also provided with a circular palette containing printed colors and usable quantities of the same colors. When in use, colors are first identified by comparing color samples on the palette with colors on the guide print, and then, apply the selected color to the appropriate spot of the panel. That particular spot is easily found, by comparing the object on the guide print with the corresponding object outlined with 3-D strokes on the panel. This kit with its method and material offers a large possibility for self expression by encouraging and showing how to change, eliminate or add new objects, shapes and colors to the master print, or if so preferred, to copy it as is.

4 Claims, 4 Drawing Figures

PAINT - BY - RAINBOW - RING ART KIT WITH PRESTROKED PANEL

BACKGROUND OF THE INVENTION

The field of this invention relates to a method of reproducing a painted picture.

The conventional paint-by-numbers and similar painting methods have no provision for change and self expression as well as for more artistic appearance. By examining these known methods, it is clear that nothing was left to the imagination and preference for the amateur's own expression. The amateur painter was literally led by hand to apply exact color on exact spot between a maze of numbered lines as well as to blend bordering colors in a way almost never used by an artist.

This new concept of painting recognizes the personality of the amateur painter, his qualities as well as his right of self expression. But this method also realizes his lack of professional skill and technical inadequacy. To compensate those important lacking ingredients of artistry, the present invention has provided a new comparative method of color application and appropriate items for its completion.

Two important goals of present invention are: First, to give impression and quality of an authentic art work, done by a professional artist, skilled in operating palette knife, brush or any other tools, with characteristic imprint of a rich texture of an professional artist. Second, to eliminate many restrictions, disadvantages and unaestheticamateurish characteristics of almost every existing kit of this kind.

SUMMARY OF THE INVENTION

The professional artist in charge of preparing the original picture, which has to be used as a guide print for the kit, must apply colors in a way that brush, palette-knife or other tool used leaves prominent, three-dimensional strokes on the panel, in order to give a rich texture and well as visible outlines of colors and objects to the panel. When the picture is finished and colors dried, the panel with its texture is imprinted into hard drying gesso paste or other material suitable for preparing the negative (die), which will be used for production of prestroked panels for the kit by the vacuum-forming technique.

Every detail of the guide print is recognizable on the prestroked panel. Those details are visible even after the colors are applied. It is these details that makes a rich texture of the painting so attractive with a professional appearance. The color guide print gives visual information where each color could or should be applied. Namely, each color on the guide print has a corresponding stroke or an easy determinable area on the panel. All those always visible strokes and outlines on the panel are those that make all experiment possible.

Another important innovation of this invention is a palette, called "Rainbow Ring". It's a round piece of plastic with vacuum-formed color containers. The palette could also be made from rigid cardboard with holes provided to insert color containers. From each container to the edge of the palette there is located a photographic color representation of the corresponding color. The center of the palette is provided with a thumb hold. Colors on the palette are grouped by objects they are used for and by the color shades. This is in order to facilitate identification of colors by comparison.

A further object of this invention, are two guide prints to be used for first and second stage operations. The first stage print presents basic colors while the second stage print comprises a finished master print. Colors on the guide prints and photographed along palette periphery are identical and to identify colors on the prints it is only necessary to compare those colors with color samples on the palette periphery.

To facilitate search and evaluation of elements which could be added as added features to the resultant picture, the kit of this invention is provided with a suggestion sheet, which is semitransparent piece of tracing paper with printed various objects pertinent to the subject matter of the guide print. These objects are traced in sizes corresponding to the objects on the panel. To this suggestion sheet is added another smaller sheet of objects of the first sheet, but in colors, which correspond to the colors on the guide print. The amateur painter is free not only to use these objects but can introduce as well something of his own imagination. In that case the painter should determine size, color and the appropriate spot by evaluating existing objects and colors on the guide print and suggestion sheet.

DETAILED DESCRIPTION OF THE INVENTION

Figure 1:
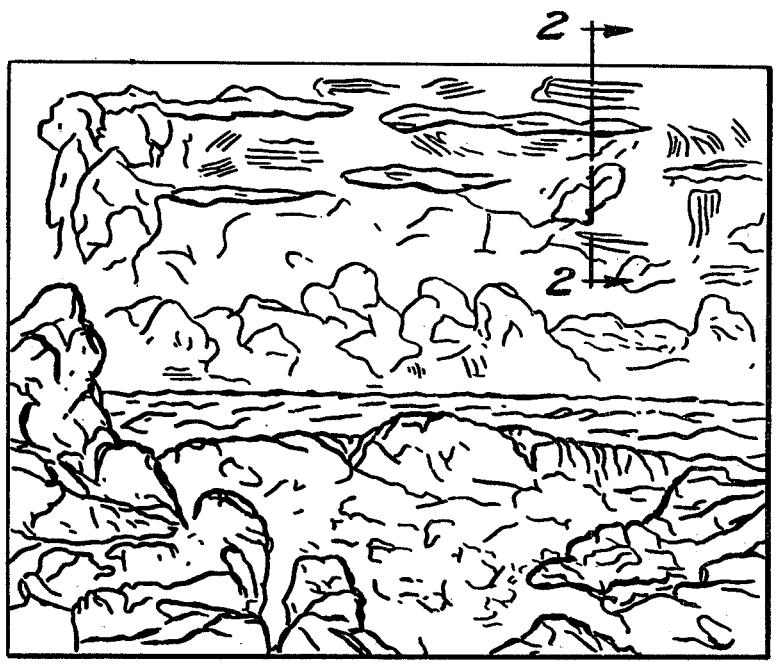
FIG. 1 is a front view of the prestroked panel used in the method of this invention constituting an outline of an original painting, created by texture of three-dimensional strokes of brush, palette-knife or other tool used.
Figure 2:
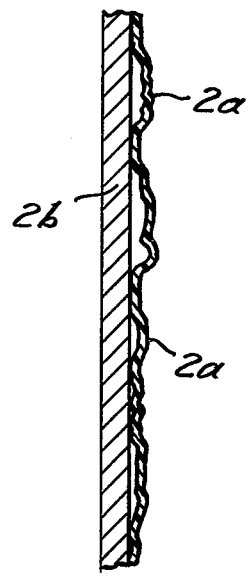
FIG. 2 is a sectional view on an enlarged scale, taken on line 2—2 of FIG. 1, showing the side view of the prestroked panel.

Before a person starts to paint, that person should study the guide print and decide whether to copy it as is or to experiment and make changes. If the painter decides to copy it as is, he has only to observe the first stage guide print to find the colors and apply them on corresponding spots. The spots are found by comparing strokes on guide print with those on the prestroked panel shown in FIG. 1.

Figure 3:
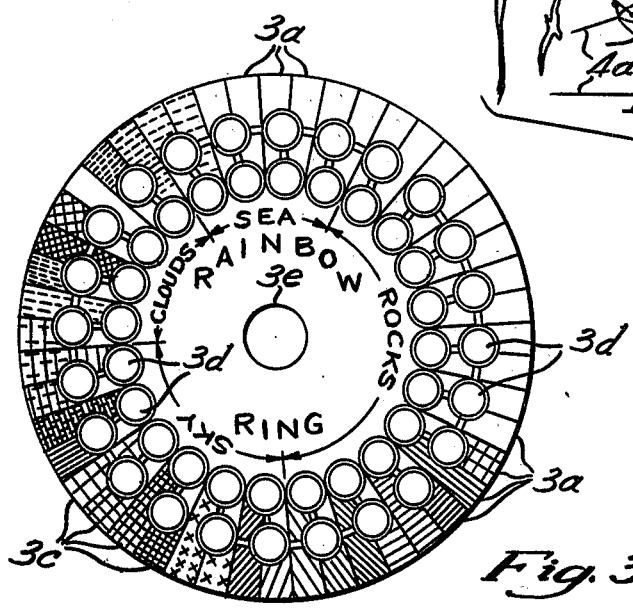
FIG. 3 shows the special circular palette called the "Rainbow Ring" with color containers and color photographic areas arranged along the periphery of the palette.

Colors are found by turning "Rainbow Ring" palette (FIG. 3) around thumb hole 3e and matching colors of a spot on the guide print with color samples 3a or 3c on the periphery of the palette and then applying a selected color to the panel for a color container 3d. When all colors are applied and dry, the painter then follows the second stage master print and continues to search and apply colors as was done in the first stage. Some of the colors from the first stage are intended to stay as they are, while others of them will serve as an undercoat for the second stage colors. If there is a blending between some of the bordering colors, the painter has to take one of the dryed colors and stroke it with a semi-dry brush over the common border until the blending is identical with blending on the guide print.

Figure 4:
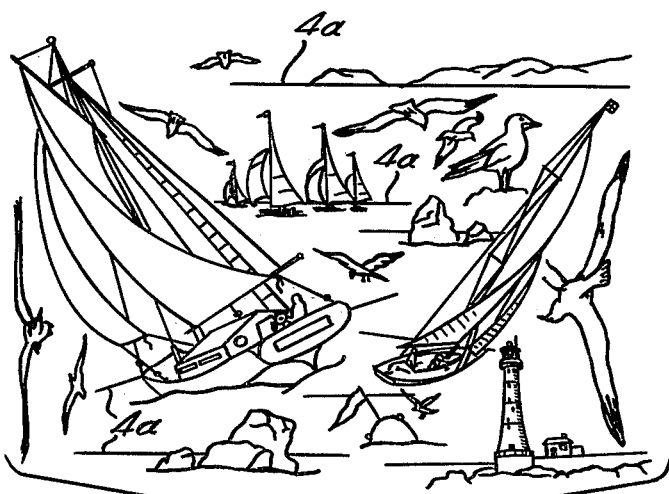
FIG. 4 is a suggestion sheet with traced various objects pertinent to the subject matter of the picture printed on semi-transparent paper.

If he chooses to experiment and make certain changes the painter has to study the guide prints and decide which details to keep and which to change. The painter may change some color partially or entirely or substitute one color for another more appropriate to his own fancy. The painter may eliminate or add certain objects as well as change its shape. The painter may use the suggestion sheet of FIG. 4. Those objects are proportional with objects of the panel and could be transferred on the panel if chosen. There is another suggestion sheet (not shown) with exactly the same objects but finished colored with colors corresponding to the colors on the guide master print. In the use of the objects the line 4a assists the painter in the aligning of the object on the panel (place the line 4a horizontal).

When the painter has his approach in mind, he has to find the spot on the panel where the pattern is to be located. If the pattern comes from the suggestion sheet (FIG. 4), he must first place the suggestion sheet on the said panel so as to see the panel topography through the suggestion sheet as well as the intended object on the same sheet. Then by moving said sheet over he searches the appropriate spot where to place the patterns. The painter has his approach in mind, when the spot is found, he then transfers the selected pattern with a carbon paper on the panel and proceeds with coloring. If the existing 3-D strokes 2a raised above the surface of backing sheet 2b of the panel are interferring with natural texture of the selected pattern, he has first to flatten the spot by being pressed with a hot iron tip. But before pressing, it is recommended to smear some linseed oil on that spot in order to prevent sticking of hot metal to the plastic panel.

The instruction sheet of this invention encourages and explains in a conventional art manner where, what and how something could or should be blended, added, eliminated or changed. Then the master print should be followed and where it could be changed. All this is explained in short tips on aesthetics, balance, composition and character of an art work.

This professionally looking method is intended not only to entertain but teach and stimulate an amateur in adventure of exploration in creative art in an easy and attractive way. Furthermore, instead of presenting a bunch of restrictive rules and a maze of lines and numbers, the method of this invention gives a short seminar in art practically showing how to paint and appreciate art, bridging in that way the gap between professional and amateur artists.

It is believed that this is the only kit where hundreds of people, working on hundreds of the same kits, can produce a hundred different paintings with each painting being good.

I claim:

1. The method of producing a painted picture from an art kit comprising the steps of:

employing a thin plastic panel within an art kit upon which is impressed in three dimensions the basic outline of a picture with there being several separate distinct sections of the picture, such as sky, sea, clouds and terrain and each said section including impressed simulated brush strokes;

also employing within the art kit at least one guide print to denote to the user the exact color object location on the thin plastic panel;

comparing the three dimensional basic outline of the panel with the color outline of the sections on the guide print thereby clearly ascertaining the type of section and its color arrangement;

having available within the art kit a plurality of shades of selected colors for each said section and each said shade is preselected to be satisfactory for the picture for representation of the said sections;

selecting a particular said shade for each said section from the respective group of color shades; and applying a thin coating of the select color shade to its respective said section thereby coloring the said section with the impressed simulated brush strokes showing through the coating of paint.

2. The method as defined in claim 1 wherein prior to the step of applying the following step is performed:

selecting an object pattern from a group of object patterns supplied within the art kit and positioning the object pattern upon the said panel in a desired location and causing the object pattern to be impressed upon the panel leaving an impression, removing the object pattern, applying appropriate color shades to the object impression.

3. The method as defined in claim 2 wherein within the step of applying the object pattern to the panel there is connected to the object pattern appropriate indicia to facilitate proper location of the object pattern upon the panel by even the most unskilled artist.

4. The method as defined in claim 1 wherein the operator may apply localized heat and pressure to a selected area of said panel to negate the pre-formed, three dimensional effect of said panel to achieve a slightly different artistic effect.

* * * * *